United States Patent
Yao (10) Patent No.: US 9,752,653 B1
(45) Date of Patent: Sep. 5, 2017

(54) SPEED REDUCER WITH ROLLERS

(71) Applicant: Tsun-Tien Yao, Taichung (TW)

(72) Inventor: Tsun-Tien Yao, Taichung (TW)

(73) Assignee: Tsun-Tien Yao, Taichung (TW)

( * ) Notice: Subject to any disclaimer, the term of this patent is extended or adjusted under 35 U.S.C. 154(b) by 0 days.

(21) Appl. No.: 15/499,909

(22) Filed: Apr. 28, 2017

(51) Int. Cl.
*F16H 1/32* (2006.01)

(52) U.S. Cl.
CPC ......... F16H 1/32 (2013.01); *F16H 2001/323* (2013.01)

(58) Field of Classification Search
CPC ....................................................... F16H 13/08
See application file for complete search history.

(56) References Cited

U.S. PATENT DOCUMENTS

| | | | | |
|---|---|---|---|---|
| 8,663,049 B1* | 3/2014 | Yao | ........................... | F16H 1/32 475/170 |
| 2007/0167268 A1* | 7/2007 | Fujimoto | .................. | F16H 1/32 475/170 |
| 2009/0075771 A1* | 3/2009 | Tesar | ...................... | B64C 13/34 475/5 |
| 2012/0108381 A1* | 5/2012 | Nakamura | ................ | F16H 1/32 475/180 |

* cited by examiner

*Primary Examiner* — Derek D Knight
(74) *Attorney, Agent, or Firm* — Yuwen Guo (57) ABSTRACT

A speed reducer comprises a sleeve-shaped rotation member, a rear carrier, a front carrier, three driving assemblies, a third bearing set, a fourth bearing set, and three wheels. When a shaft of a motor inserts into the front central through hole, each axial hole of each wheel, and the rear central through hole and then drives each driving assembly to rotate, the first bearing set and the second bearing set both operate to an inner peripheral of each corresponding through hole of each wheel and the outer rollers of each wheel drive the inner rollers of the sleeve-shaped rotation member due to the eccentric arrangement of the first rod section and the second rod section of the eccentric rod so as to drive the sleeve-shaped rotation member to rotate and then achieve the effect of reducing speed.

3 Claims, 10 Drawing Sheets

SPEED REDUCER WITH ROLLERS

FIELD OF THE INVENTION

The present invention relates to a speed reducing driving equipment, and more particularly to a speed reducer with rollers to achieve the effect of increasing the ration of reducing speed due to the arrangement of a sleeve-shaped rotation member and at least two driving assemblies.

BACKGROUND OF THE INVENTION

A conventional speed reducer may comprise a casing, a high speed shaft connecting to an eccentric rod having a plurality of different, hollow pinion rollers, a plurality of low speed shaft pins rotatably disposed in the pinion rollers respectively and each having one end opposite to the high speed shaft and connected to the low speed shaft, a gear roller retaining ring mounted on the pinion rollers for confining the pinion rollers, and a plurality of ring gear pins each enveloped with a ring gear roller for rotatably engaging with the hollow pinion rollers and each having both ends connecting to an inner surface of the casing. Rotation of the eccentric rod rotates the pinion rollers about the ring gear pins to actuate the low speed shaft pins so as to rotate in the pinion rollers for speed reduction.

However, the conventional speed reducer needs an output shaft so that it needs many elements, the structure is complicated and the total thickness is thicker. It is hard to meet the request of thinning market.

Furthermore, the ratio of reducing speed is not increased. If the reducing speed needs to be increased, the volume needs to be increased. The cost is hard to reduce. Thus, the need for improvement still exists.

In view of the foregoing circumstances, the inventor has invested a lot of time to study the relevant knowledge, compare the pros and cons, research and develop related products. After quite many expetireents and tests, the "speed reducer with rollers" of this invention is eventually launched to improve the foregoing shortcomings, to meet the public use.

SUMMARY OF THE INVENTION

An object of this invention is providing a speed reducer with rollers. It does not need an output shaft but just uses the rotation of the sleeve-shaped rotation member to achieve the effect of reducing speed.

Another object of this invention is providing a speed reducer with rollers. It may save elements, simplify structure, and reduce cost. Furthermore, the total thickness of the speed reducer 1 may be thinner to meet the request of the thinning market.

To achieve above objects, a speed reducer with rollers may comprise comprising a sleeve-shaped rotation member, a rear carrier, a front carrier, three driving assemblies, a third bearing set, a fourth bearing set, and three wheels, wherein: two sides of the sleeve-shaped rotation member are respectively connected with the rear carrier and the front carrier, the rear carrier covers an outer peripheral of one side of the sleeve-shaped rotation member and the front carrier press-fits in the other side of the sleeve-shaped rotation member opposite to the rear carrier, the rear carrier and the front carrier are detachably connected with each other by a plurality of bolts, and a plurality of inner rollers is equally angularly spaced apart and axially arranged at an inner surface of the sleeve-shaped rotation member; the rear carrier has a rear central through hole, at least two rear pivoting holes equally angularly spaced apart, and a plurality of rear fixing holes, each of the rear fixing holes is arranged between two adjacent rear pivoting holes; the front carrier has a front central through hole, at least two front pivoting holes equally angularly spaced apart, and a plurality of front fixing holes, each front fixing hole is arranged between two adjacent front pivoting holes, the front central through hole is arranged corresponding to the rear central through hole, each front pivoting hole is arranged corresponding to each rear pivoting hole, a number of the front pivoting holes is equal to a number of the rear pivoting holes, each front fixing hole is arranged corresponding to each rear fixing hole, and a number of the front fixing holes is equal to a number of the rear fixing holes; the third bearing set is arranged between the sleeve-shaped rotation member and the rear carrier, and the fourth bearing set is arranged between the sleeve-shaped rotation member and the front carrier; each driving assembly passes through each corresponding rear pivoting hole and each corresponding front pivoting hole, and each driving assembly and each inner roller of the sleeve-shaped rotation member are eccentrically operated; the three wheels are arranged in the sleeve-shaped rotation member in parallel, each wheel has an axial hole, at least two through holes equally angularly spaced apart and a plurality of openings, each opening is arranged between two adjacent through holes, the axial hole is arranged corresponding to the front central through hole and the rear central through hole, the through hole of each wheel is arranged corresponding to each front pivoting hole of the front carrier and each rear pivoting hole of the rear carrier, each opening is arranged corresponding to each front fixing hole of the front carrier and each rear fixing hole of the rear carrier, a plurality of outer rollers is axially arranged at a peripheral of each wheel and operates with each inner roller of the sleeve-shaped rotation member, and a bolt passes through each front fixing hole of the front carrier, each opening of each wheel, and each rear fixing hole of the rear carrier so that the front carrier and the rear carrier are detachably connected with each other; and each driving assembly has a first bearing set, a second bearing set, and an eccentric rod, the eccentric rod has a first rod section and a second rod section which are eccentrically connected with each other, the first bearing set covers one end of the first rod section which is opposite to the second rod section, the first bearing set is press-fit in the corresponding rear pivoting hole, the second bearing set has a first outer-roller bearing, a second outer-roller bearing, and a third outer-roller bearing, the first outer-roller bearing covers the first rod section and located between the first bearing set and the second rod section, the second outer-roller bearing and the third outer-roller bearing covers the second rod section in parallel, the first outer-roller bearing is press-fit in the corresponding through hole of one of the three wheels which is adjacent to the rear carrier, and the second outer-roller bearing and the third outer-roller bearing are respectively press-fit in the corresponding through holes of the other two wheels.

In some embodiments, when a shaft of a motor inserts into the front central through hole, each axial hole of each wheel, and the rear central through hole and then drives each driving assembly to rotate, the first bearing set and the second bearing set both operate to an inner peripheral of each corresponding through hole of each wheel and the outer rollers of each wheel drive the inner rollers of the sleeve-shaped rotation member due to the eccentric arrangement of the first rod section and the second rod section of the eccentric rod so as to drive the sleeve-shaped rotation member to rotate.

To achieve above objects, a speed reducer with rollers may comprise a sleeve-shaped rotation member, a rear carrier, a front carrier, three driving assemblies, a third bearing set, a fourth bearing set, and three wheels, wherein: two sides of the sleeve-shaped rotation member are respectively connected with the rear carrier and the front carrier, the rear carrier covers an outer peripheral of one side of the sleeve-shaped rotation member and the front carrier press-fits in the other side of the sleeve-shaped rotation member opposite to the rear carrier, the rear carrier and the front carrier are detachably connected with each other by a plurality of bolts, and a plurality of inner rollers is equally angularly spaced apart and axially arranged at an inner surface of the sleeve-shaped rotation member; the rear carrier has a rear central through hole, at least two rear pivoting holes equally angularly spaced apart, and a plurality of rear fixing holes, each of the rear fixing holes is arranged between two adjacent rear pivoting holes; the front carrier has a front central through hole, at least two front pivoting holes equally angularly spaced apart, and a plurality of front fixing holes, each front fixing hole is arranged between two adjacent front pivoting holes, the front central through hole is arranged corresponding to the rear central through hole, each front pivoting hole is arranged corresponding to each rear pivoting hole, a number of the front pivoting holes is equal to a number of the rear pivoting holes, each front fixing hole is arranged corresponding to each rear fixing hole, and a number of the front fixing holes is equal to a number of the rear fixing holes; the third bearing set is arranged between the sleeve-shaped rotation member and the rear carrier, and the fourth bearing set is arranged between the sleeve-shaped rotation member and the front carrier; each driving assembly passes through each corresponding rear pivoting hole and each corresponding front pivoting hole, and each driving assembly and each inner roller of the sleeve-shaped rotation member are eccentrically operated; the three wheels are arranged in the sleeve-shaped rotation member in parallel, each wheel has an axial hole, at least two through holes equally angularly spaced apart and a plurality of openings, each opening is arranged between two adjacent through holes, the axial hole is arranged corresponding to the front central through hole and the rear central through hole, the through hole of each wheel is arranged corresponding to each front pivoting hole of the front carrier and each rear pivoting hole of the rear carrier, each opening is arranged corresponding to each front fixing hole of the front carrier and each rear fixing hole of the rear carrier, a peripheral of each wheel operates with the inner rollers of the sleeve-shaped rotation member, and a bolt passes through each front fixing hole of the front carrier, each opening of each wheel, and each rear fixing hole of the rear carrier so that the front carrier and the rear carrier are detachably connected with each other; and each driving assembly has a first bearing set, a second bearing set, and an eccentric rod, the eccentric rod has a first rod section and a second rod section which are eccentrically connected with each other, the first bearing set covers one end of the first rod section which is opposite to the second rod section, the first bearing set is press-fit in the corresponding rear pivoting hole, the second bearing set has a first outer-roller bearing, a second outer-roller bearing, and a third outer-roller bearing, the first outer-roller bearing covers the first rod section and located between the first bearing set and the second rod section, the second outer-roller bearing and the third outer-roller bearing covers the second rod section in parallel, the first outer-roller bearing is press-fit in the corresponding through hole of one of the three wheels which is adjacent to the rear carrier, and the second outer-roller bearing and the third outer-roller bearing are respectively press-fit in the corresponding through holes of the other two wheels.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Referring now to the drawings where like characteristics and features among the various figures are denoted by like reference characters.

Figure 1:
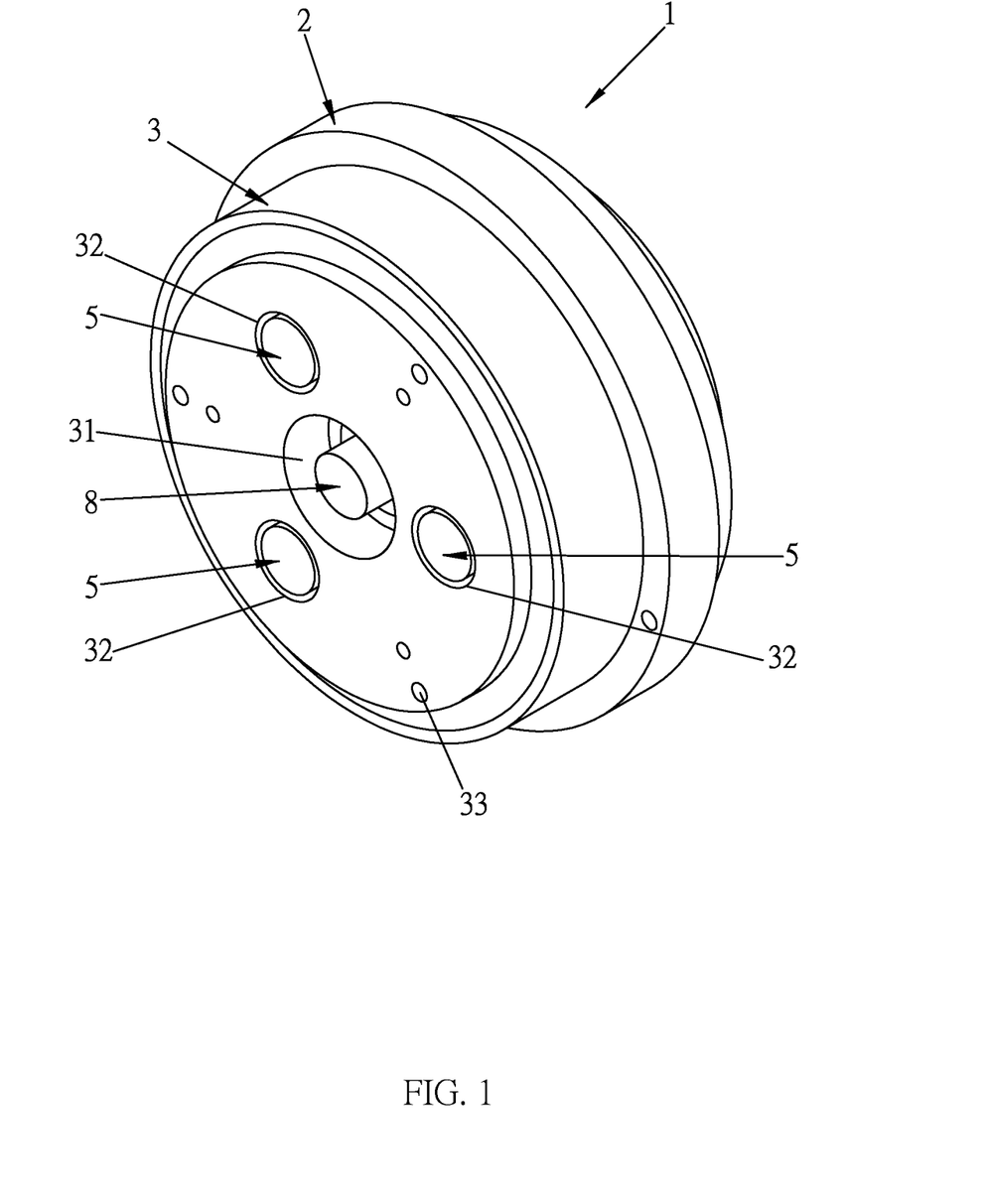
FIG. 1 is a rear perspective view of a speed reducer with rollers of the present invention.
Figure 2:
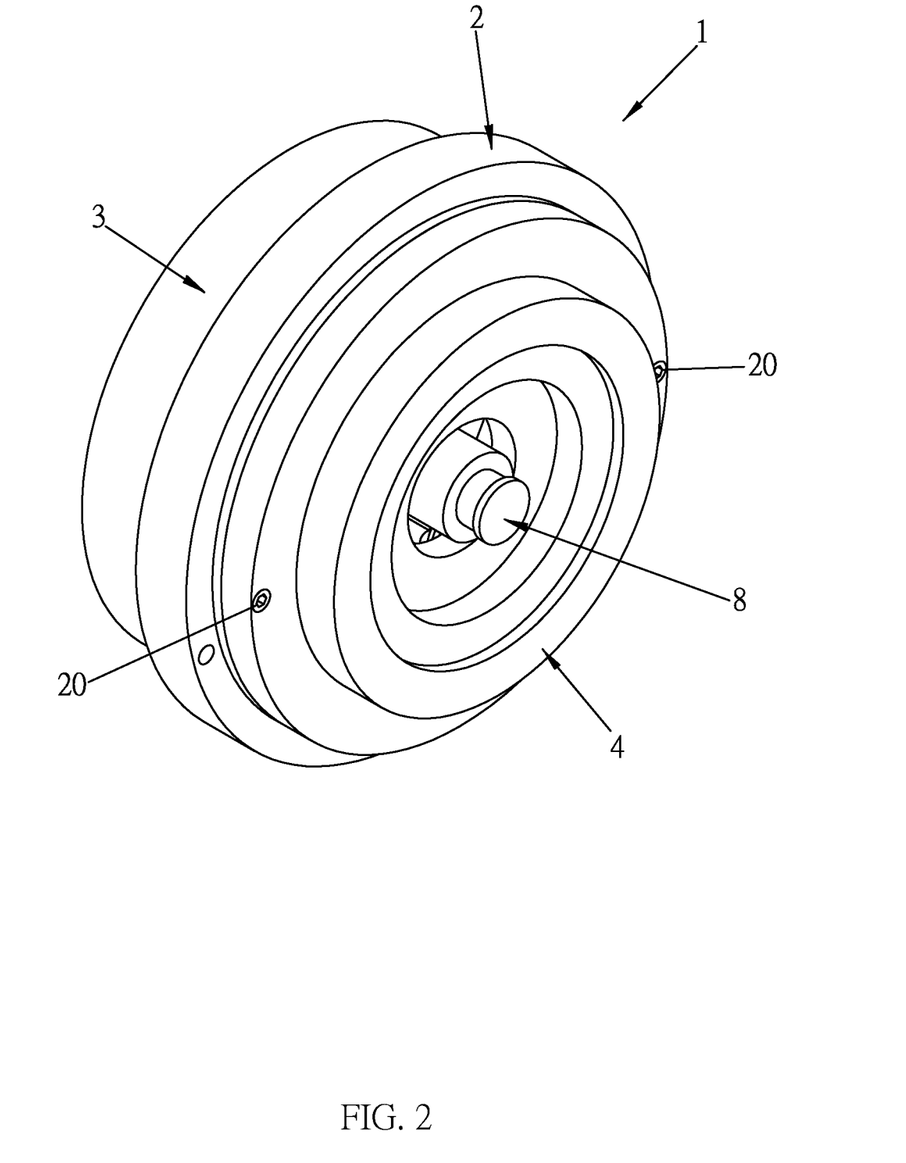
FIG. 2 is a front perspective view of the speed reducer with rollers of the present invention.
Figure 3:
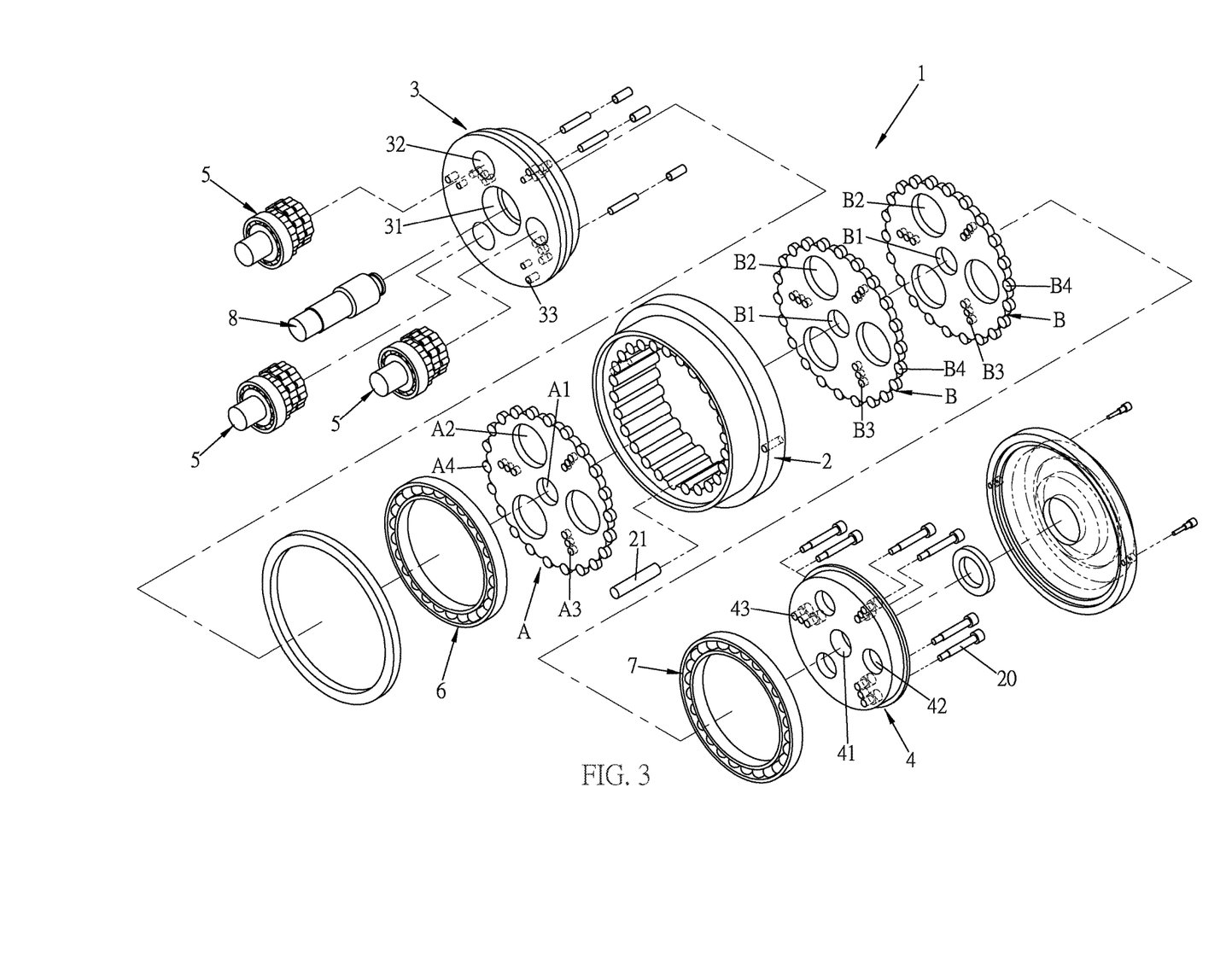
FIG. 3 is an exploded view of the speed reducer with rollers of the present invention.
Figure 4:
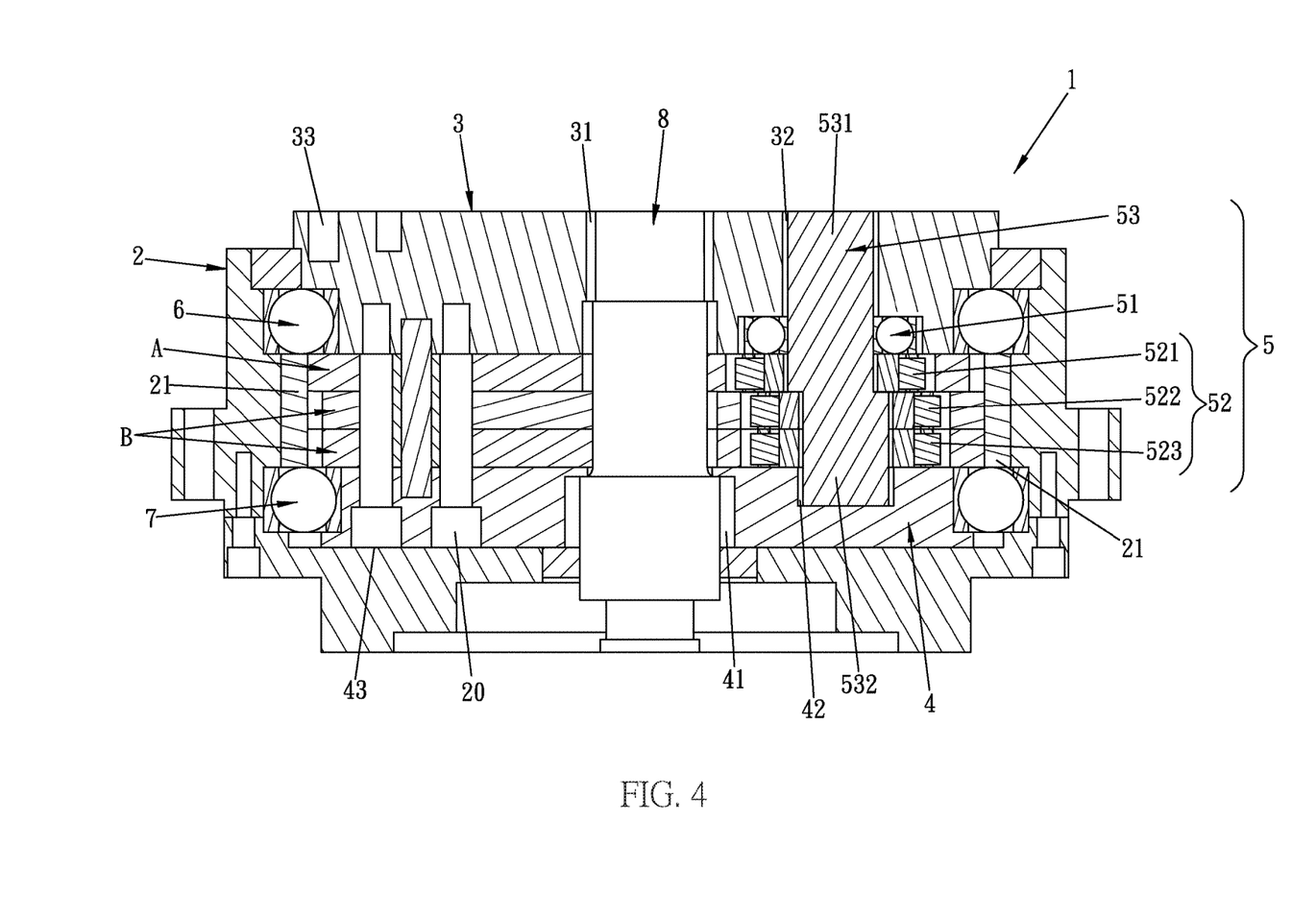
FIG. 4 is a cross-sectional view of the speed reducer with rollers of the present invention.
Figure 5:
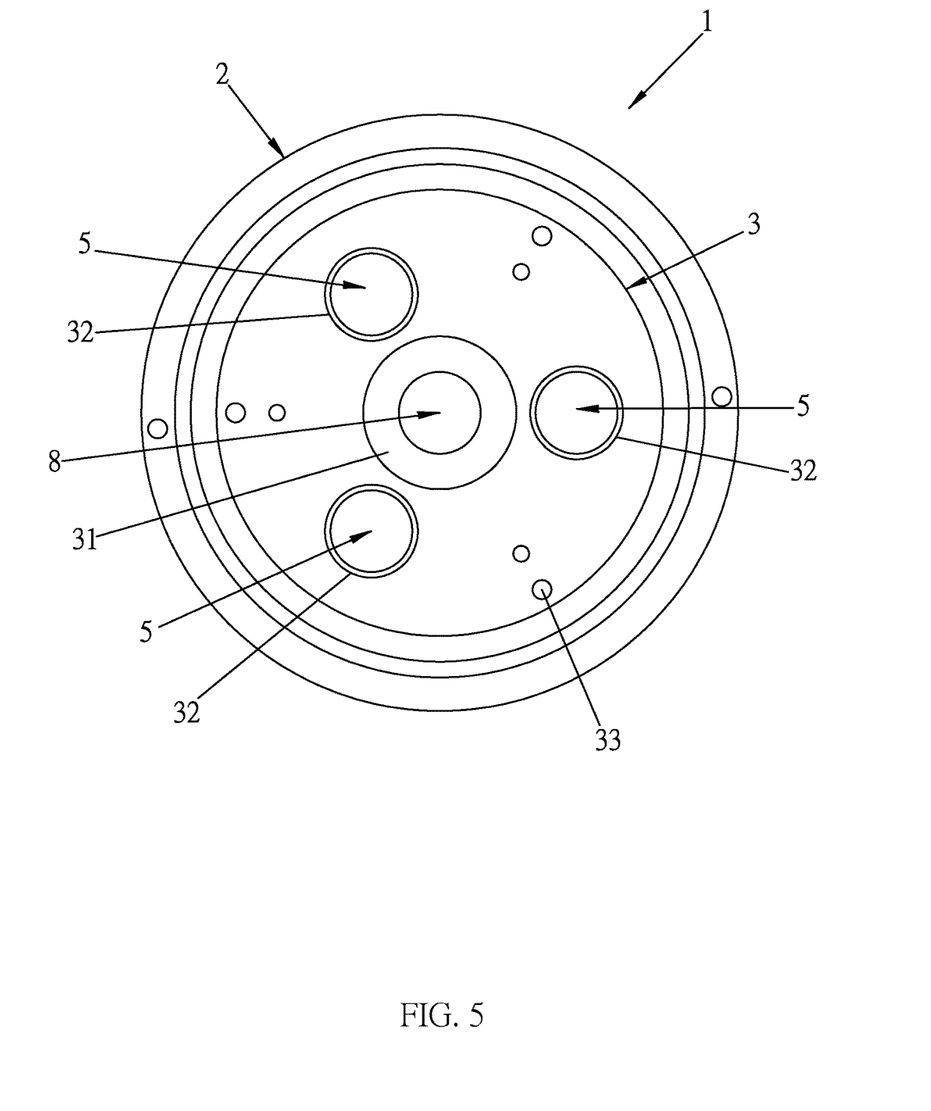
FIG. 5 is a rear plan view of the speed reducer with rollers of the present invention.
Figure 6:
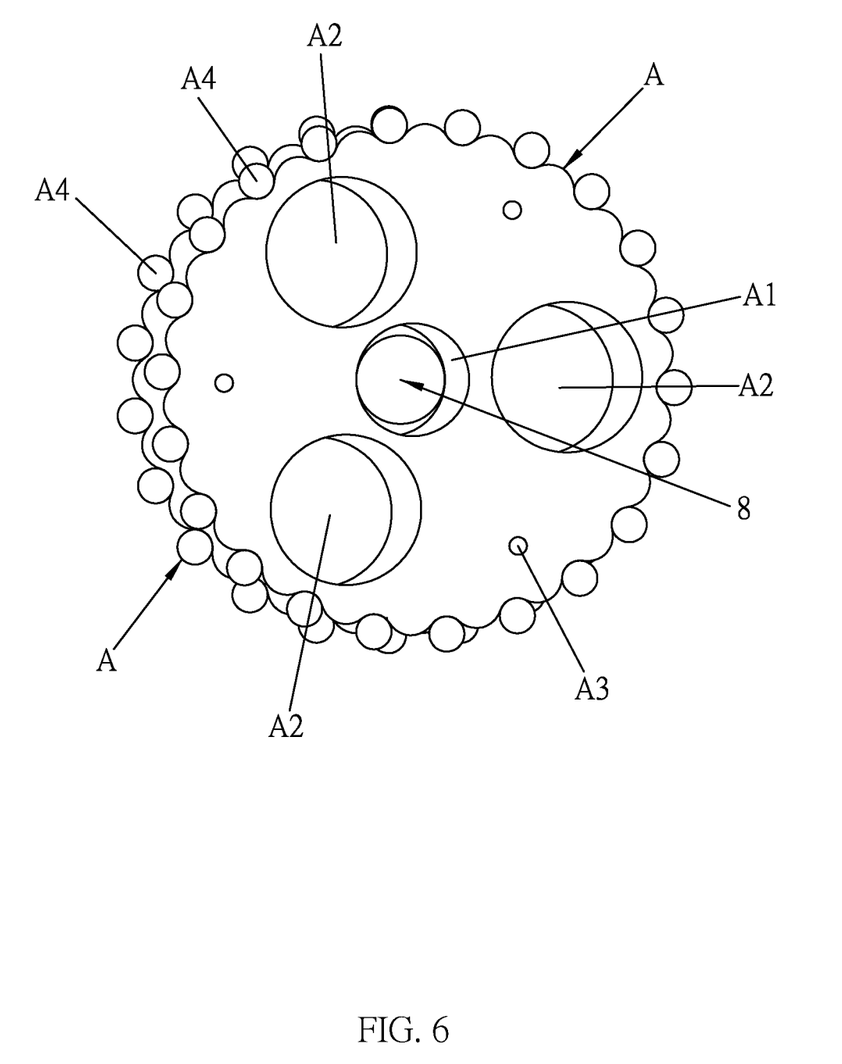
FIG. 6 is an operational view of the wheels of the speed reducer with rollers of the present invention of the present invention.
Figure 7:
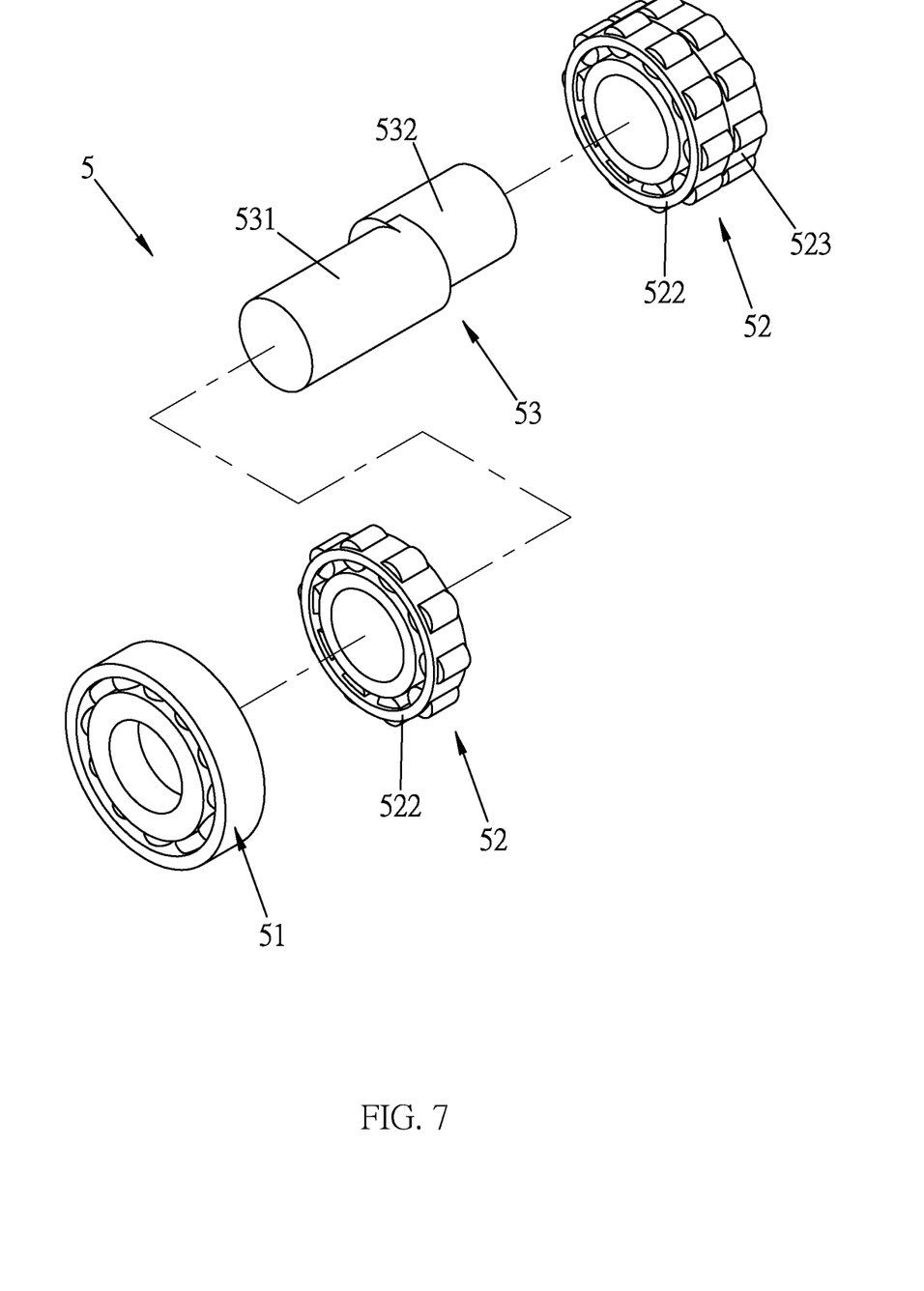
FIG. 7 is an exploded view of the driving assembly of the speed reducer with rollers of the present invention.

Please refer to FIGS. 1 to 7, FIG. 1 is a rear perspective view of a speed reducer with rollers of the present invention, FIG. 2 is a front perspective view of the speed reducer with rollers of the present invention, FIG. 3 is an exploded view of the speed reducer with rollers of the present invention, FIG. 4 is a cross-sectional view of the speed reducer with rollers of the present invention, FIG. 5 is a rear plan view of the speed reducer with rollers of the present invention, FIG. 6 is an operational view of the wheels of the speed reducer with rollers of the present invention of the present invention, and FIG. 7 is an exploded view of the driving assembly of the speed reducer with rollers of the present invention.

A speed reducer with rollers 1 may comprise a sleeve-shaped rotation member 2, a rear carrier 3, a front carrier 4, at least two driving assemblies 5, a third bearing set 6, a fourth bearing set 7, and three wheels. The number of the driving assemblies may be THREE for illustration in this embodiment, but not limited thereto.

Two sides of the sleeve-shaped rotation member 1 are respectively connected with the rear carrier 3 and the front carrier 4. The rear carrier 3 covers an outer peripheral of one side of the sleeve-shaped rotation member 2 and the front carrier 4 press-fits in the other side of the sleeve-shaped rotation member 2 opposite to the rear carrier 3. The rear carrier 3 and the front carrier 4 are detachably connected with each other by a plurality of bolts 20. A plurality of inner rollers 21 is equally angularly spaced apart and axially arranged at an inner surface of the sleeve-shaped rotation member 2.

The rear carrier 3 has a rear central through hole 31, at least two rear pivoting holes 32 equally angularly spaced apart, and a plurality of rear fixing holes 33. Each of the rear fixing holes 33 is arranged between two adjacent rear pivoting holes 32. The number of the rear pivoting holes 32 is equal to the number of the driving assemblies 5. In this embodiment, the number of the rear pivoting holes 32 is three for illustration.

The front carrier 4 has a front central through hole 41, at least two front pivoting holes 42 equally angularly spaced apart, and a plurality of front fixing holes 43. Each front fixing hole 43 is arranged between two adjacent front pivoting holes 42. The number of the front pivoting holes 42 is equal to the number of the driving assemblies 5. In this embodiment, the number of the front pivoting holes 42 is three for illustration. The front central through hole 41 is arranged corresponding to the rear central through hole 31. Each front pivoting hole 42 is arranged corresponding to each rear pivoting hole 32. A number of the front pivoting holes 42 is equal to a number of the rear pivoting holes 32. Each front fixing hole 43 is arranged corresponding to each rear fixing hole 33. A number of the front fixing holes 43 is equal to a number of the rear fixing holes 33.

The third bearing set 6 is arranged between the sleeve-shaped rotation member 2 and the rear carrier 3. The fourth bearing set 7 is arranged between the sleeve-shaped rotation member 2 and the front carrier 4.

The three wheels are arranged in the sleeve-shaped rotation member 2 in parallel. The three wheels includes two front wheels B and one rear wheel A. The structure of each front wheel B is that same as the structure of the rear wheel A. Each front wheel B has a front axial hole B1 arranged adjacent to the front carrier 4, at least two front through holes B2 equally angularly spaced apart and a plurality of front openings B3. Each front opening B3 is arranged between two adjacent front through holes B2. The rear wheel A has a rear axial hole A1 arranged adjacent to the rear carrier 3, at least two rear through holes A2 equally angularly spaced apart and a plurality of rear openings A3. Each rear opening A3 is arranged between two adjacent rear through holes A2. The number of the front through holes B2 and the number of the rear through holes A2 are respectively the same as the number of the driving assemblies 5. In this embodiment, the number of the front through holes B2 and the number of the rear through holes A2 are three respectively for illustration. The front axial hole B1 and the rear axial hole A1 are arranged corresponding to the front central through hole 41 and the rear central through hole 31 respectively. Each front through hole B2 and each rear through hole A2 are respectively arranged corresponding to each front pivoting hole 42 of the front carrier 4 and each rear pivoting hole 32 of the rear carrier 3. Each front opening B3 and each rear opening A3 are respectively arranged corresponding to each front fixing hole 43 of the front carrier 4 and each rear fixing hole 33 of the rear carrier 3. A bolt passes through each front fixing hole 43 of the front carrier 4, each front opening B3 and each rear opening A3, and each rear fixing hole 33 of the rear carrier 3 so that the front carrier 4 and the rear carrier 3 are detachably connected with each other.

A plurality of outer rollers is axially arranged at a peripheral of each wheel A, B and operates with each inner roller 21 of the sleeve-shaped rotation member 2.

Each driving assembly 5 passes through each corresponding rear pivoting hole 32 and each corresponding front pivoting hole 42, each corresponding front through hole B2, and each corresponding rear through hole A2. Please refer to FIG. 7, each driving assembly 5 and each inner roller 21 of the sleeve-shaped rotation member 2 are eccentrically operated. Each driving assembly 5 has a first bearing set 51, a second bearing set 52, and an eccentric rod 53. The eccentric rod 53 has a first rod section 531 and a second rod section 532 which are eccentrically connected with each other. The first bearing set 51 covers one end of the first rod section 531 which is opposite to the second rod section 532. The first bearing set 51 is press-fit in the corresponding rear pivoting hole 32. The second bearing set 52 has a first outer-roller bearing 521, a second outer-roller bearing 522, and a third outer-roller bearing 523. The first outer-roller bearing 521 covers the first rod section 531 and located between the first bearing set 51 and the second rod section 532. The second outer-roller bearing 522 and the third outer-roller bearing 523 covers the second rod section 523 in parallel. The first outer-roller bearing 521 is press-fit in the corresponding rear through hole A2 of the front wheel A which is adjacent to the rear carrier 3. The second outer-roller bearing 522 and the third outer-roller bearing 523 are respectively press-fit in the corresponding front through holes of the other two wheels (front wheels B).

Therefore, when a shaft 8 (shown in FIG. 3) of a motor (not shown) inserts into the front central through hole 41, the front axial hole B1, the rear axial hole A1, and the rear central through hole 321 and then drives each driving assembly 5 to rotate, the first bearing set 51 and the second bearing set 52 both operate to an inner peripheral of each corresponding through hole A2, B2 of each wheel A, B and the outer rollers of each wheel (the front outer rollers A4 are arranged at an outer peripheral of the front wheel A and the rear outer rollers B4 are arranged at an outer peripheral of the rear wheel B) drive the inner rollers 21 of the sleeve-shaped rotation member 2 due to the eccentric arrangement of the first rod section 531 and the second rod section 532 of the eccentric rod 53 so as to drive the sleeve-shaped rotation member 2 to rotate and achieve the effect of reducing speed.

Figure 8:
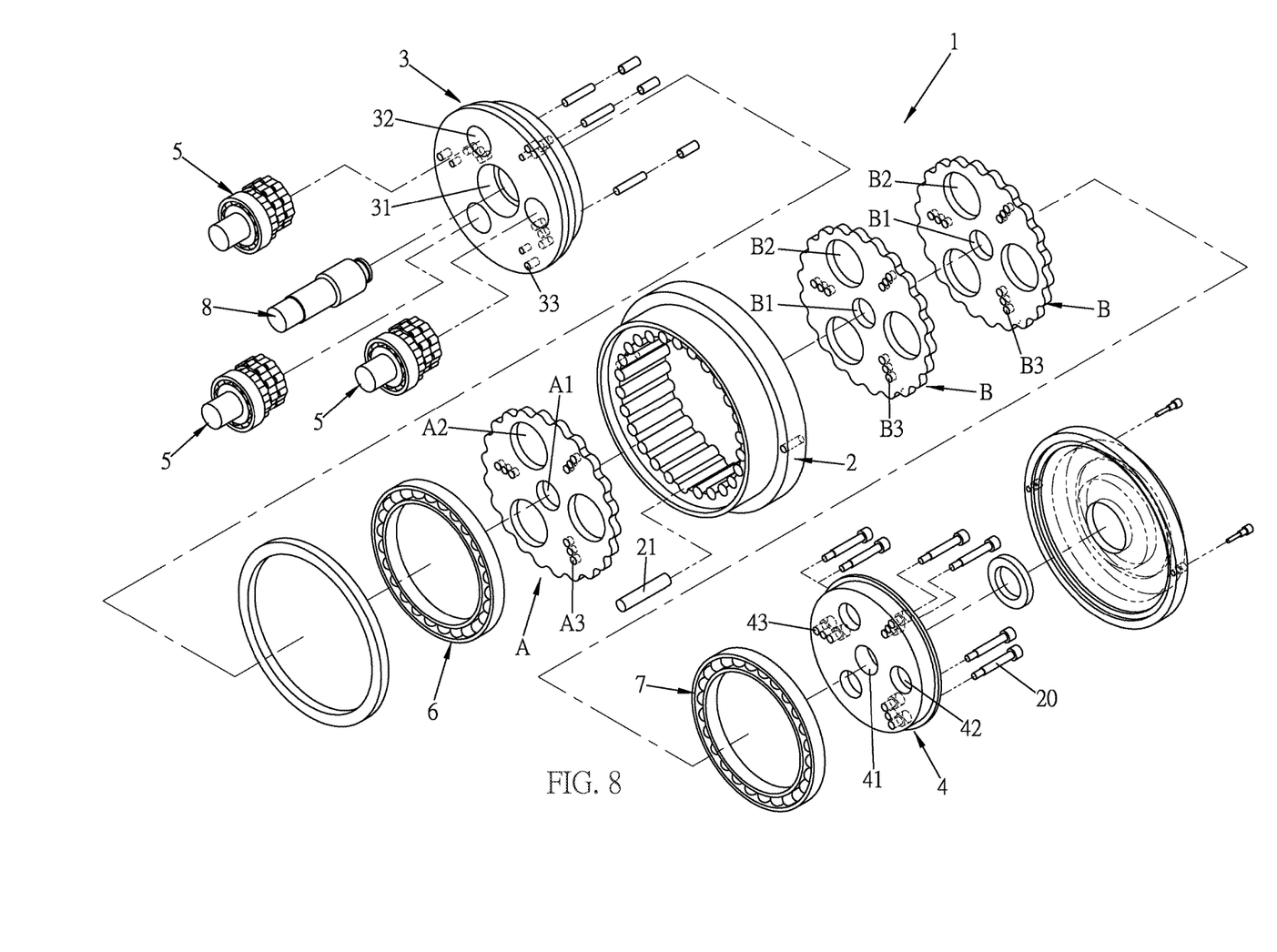
FIG. 8 is an exploded view of another embodiment of the speed reducer with rollers of the present invention.
Figure 9:
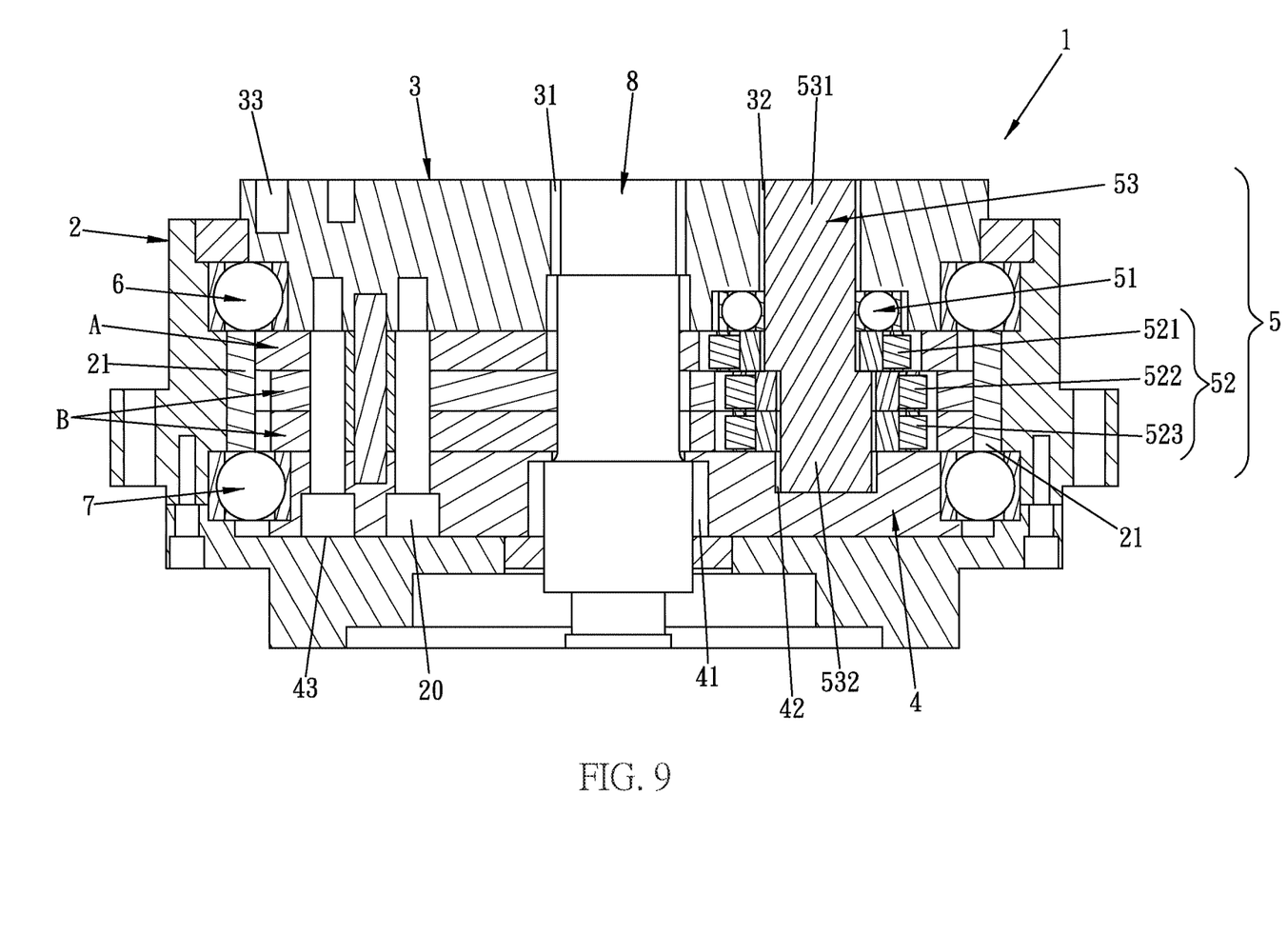
FIG. 9 is a cross-sectional view of the another embodiment of the speed reducer with rollers of the present invention.
Figure 10:
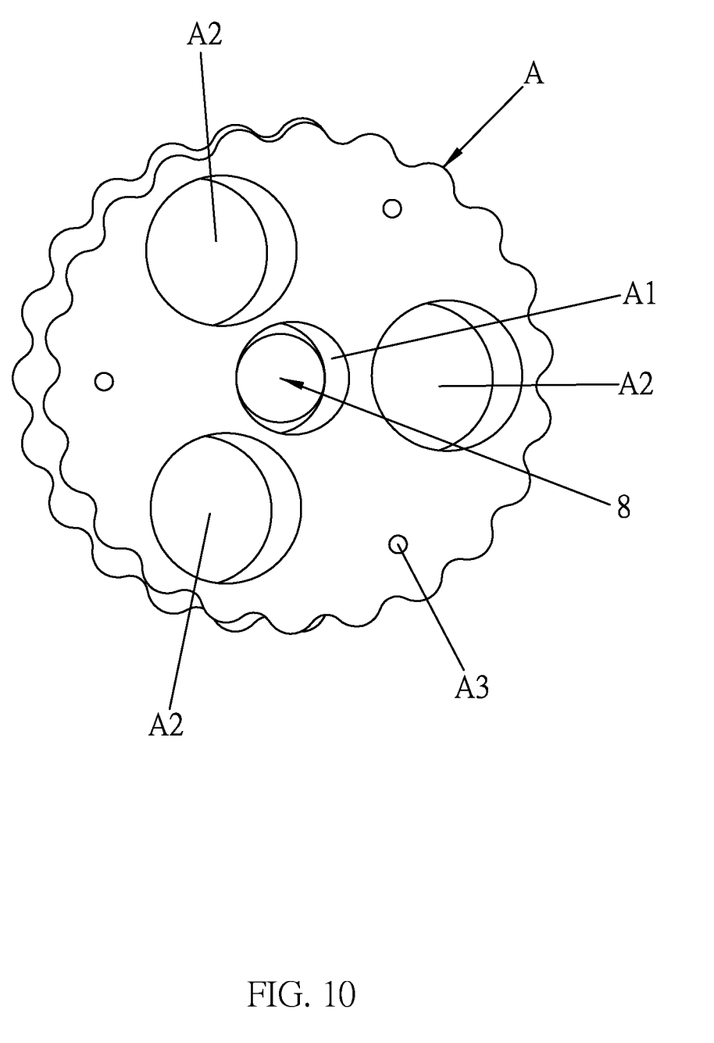
FIG. 10 is an operational view of the wheels of the another embodiment of the speed reducer with rollers of the present invention.

Please refer to FIGS. 8 to 10, FIG. 8 is an exploded view of another embodiment of the speed reducer with rollers of the present invention, FIG. 9 is a cross-sectional view of the another embodiment of the speed reducer with rollers of the present invention, and FIG. 10 is an operational view of the wheels of the another embodiment of the speed reducer with rollers of the present invention.

The structure of this embodiment shown in FIGS. 1 to 7 is similar to the structure of the embodiment shown in FIGS. 8 to 10. The difference between those two embodiments is that the embodiment sown in FIGS. 8 to 10 has the front wheels B without the front outer rollers B4 and the rear wheel A without the rear outer rollers A4. The peripherals of each front wheel B and the rear wheel A operate to the inner rollers of the sleeve-shaped rotation member 2 so as to oscillate cycloidally (shown as in FIG. 10).

According to above mentioned structure, compared to the conventional structure and skill of speed reducer, the speed reducer 1 with rollers of this invention does not need an output shaft but just uses the rotation of the sleeve-shaped rotation member 2 to achieve the effect of reducing speed. Due to the arrangement of the at least two driving assemblies 5 which are not driven by the gears, they are driven by the first bearing set 51 and the eccentric arrangement of the eccentric rod 53. It may reduce friction and further increase the ration of reducing speed. Therefore, it may save elements, simplify structure, and reduce cost. Furthermore, the total thickness of the speed reducer 1 may be thinner to meet the request of the thinning market.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A speed reducer with rollers, comprising a sleeve-shaped rotation member, a rear carrier, a front carrier, three driving assemblies, a third bearing set, a fourth bearing set, and three wheels, wherein:

two sides of the sleeve-shaped rotation member are respectively connected with the rear carrier and the front carrier, the rear carrier covers an outer peripheral of one side of the sleeve-shaped rotation member and the front carrier press-fits in the other side of the sleeve-shaped rotation member opposite to the rear carrier, the rear carrier and the front carrier are detachably connected with each other by a plurality of bolts, and a plurality of inner rollers is equally angularly spaced apart and axially arranged at an inner surface of the sleeve-shaped rotation member;

the rear carrier has a rear central through hole, at least two rear pivoting holes equally angularly spaced apart, and a plurality of rear fixing holes, each of the rear fixing holes is arranged between two adjacent rear pivoting holes;

the front carrier has a front central through hole, at least two front pivoting holes equally angularly spaced apart, and a plurality of front fixing holes, each front fixing hole is arranged between two adjacent front pivoting holes, the front central through hole is arranged corresponding to the rear central through hole, each front pivoting hole is arranged corresponding to each rear pivoting hole, a number of the front pivoting holes is equal to a number of the rear pivoting holes, each front fixing hole is arranged corresponding to each rear fixing hole, and a number of the front fixing holes is equal to a number of the rear fixing holes;

the third bearing set is arranged between the sleeve-shaped rotation member and the rear carrier, and the fourth bearing set is arranged between the sleeve-shaped rotation member and the front carrier;

each driving assembly passes through each corresponding rear pivoting hole and each corresponding front pivoting hole, and each driving assembly and each inner roller of the sleeve-shaped rotation member are eccentrically operated;

the three wheels are arranged in the sleeve-shaped rotation member in parallel, each wheel has an axial hole, at least two through holes equally angularly spaced apart and a plurality of openings, each opening is arranged between two adjacent through holes, the axial hole is arranged corresponding to the front central through hole and the rear central through hole, the through hole of each wheel is arranged corresponding to each front pivoting hole of the front carrier and each rear pivoting hole of the rear carrier, each opening is arranged corresponding to each front fixing hole of the front carrier and each rear fixing hole of the rear carrier, a plurality of outer rollers is axially arranged at a peripheral of each wheel and operates with each inner roller of the sleeve-shaped rotation member, and a bolt passes through each front fixing hole of the front carrier, each opening of each wheel, and each rear fixing hole of the rear carrier so that the front carrier and the rear carrier are detachably connected with each other; and each driving assembly has a first bearing set, a second bearing set, and an eccentric rod, the eccentric rod has a first rod section and a second rod section which are eccentrically connected with each other, the first bearing set covers one end of the first rod section which is opposite to the second rod section, the first bearing set is press-fit in the corresponding rear pivoting hole, the second bearing set has a first outer-roller bearing, a second outer-roller bearing, and a third outer-roller bearing, the first outer-roller bearing covers the first rod section and located between the first bearing set and the second rod section, the second outer-roller bearing and the third outer-roller bearing covers the second rod section in parallel, the first outer-roller bearing is press-fit in the corresponding through hole of one of the three wheels which is adjacent to the rear carrier, and the second outer-roller bearing and the third outer-roller bearing are respectively press-fit in the corresponding through holes of the other two wheels.

2. The speed reducer as claimed in claim 1, wherein when a shaft of a motor inserts into the front central through hole, each axial hole of each wheel, and the rear central through hole and then drives each driving assembly to rotate, the first bearing set and the second bearing set both operate to an inner peripheral of each corresponding through hole of each wheel and the outer rollers of each wheel drive the inner rollers of the sleeve-shaped rotation member due to the eccentric arrangement of the first rod section and the second rod section of the eccentric rod so as to drive the sleeve-shaped rotation member to rotate.

3. A speed reducer with rollers, comprising a sleeve-shaped rotation member, a rear carrier, a front carrier, three driving assemblies, a third bearing set, a fourth bearing set, and three wheels, wherein:

two sides of the sleeve-shaped rotation member are respectively connected with the rear carrier and the front carrier, the rear carrier covers an outer peripheral of one side of the sleeve-shaped rotation member and the front carrier press-fits in the other side of the sleeve-shaped rotation member opposite to the rear carrier, the rear carrier and the front carrier are detachably connected with each other by a plurality of bolts, and a plurality of inner rollers is equally angularly spaced apart and axially arranged at an inner surface of the sleeve-shaped rotation member;

the rear carrier has a rear central through hole, at least two rear pivoting holes equally angularly spaced apart, and a plurality of rear fixing holes, each of the rear fixing holes is arranged between two adjacent rear pivoting holes;

the front carrier has a front central through hole, at least two front pivoting holes equally angularly spaced apart, and a plurality of front fixing holes, each front fixing hole is arranged between two adjacent front pivoting holes, the front central through hole is arranged corresponding to the rear central through hole, each front pivoting hole is arranged corresponding to each rear pivoting hole, a number of the front pivoting holes is equal to a number of the rear pivoting holes, each front fixing hole is arranged corresponding to each rear fixing hole, and a number of the front fixing holes is equal to a number of the rear fixing holes;

the third bearing set is arranged between the sleeve-shaped rotation member and the rear carrier, and the fourth bearing set is arranged between the sleeve-shaped rotation member and the front carrier;

each driving assembly passes through each corresponding rear pivoting hole and each corresponding front pivoting hole, and each driving assembly and each inner roller of the sleeve-shaped rotation member are eccentrically operated;

the three wheels are arranged in the sleeve-shaped rotation member in parallel, each wheel has an axial hole, at least two through holes equally angularly spaced apart and a plurality of openings, each opening is arranged between two adjacent through holes, the axial hole is arranged corresponding to the front central through hole and the rear central through hole, the through hole of each wheel is arranged corresponding to each front pivoting hole of the front carrier and each rear pivoting hole of the rear carrier, each opening is arranged corresponding to each front fixing hole of the front carrier and each rear fixing hole of the rear carrier, a peripheral of each wheel operates with the inner rollers of the sleeve-shaped rotation member, and a bolt passes through each front fixing hole of the front carrier, each opening of each wheel, and each rear fixing hole of the rear carrier so that the front carrier and the rear carrier are detachably connected with each other; and each driving assembly has a first bearing set, a second bearing set, and an eccentric rod, the eccentric rod has a first rod section and a second rod section which are eccentrically connected with each other, the first bearing set covers one end of the first rod section which is opposite to the second rod section, the first bearing set is press-fit in the corresponding rear pivoting hole, the second bearing set has a first outer-roller bearing, a second outer-roller bearing, and a third outer-roller bearing, the first outer-roller bearing covers the first rod section and located between the first bearing set and the second rod section, the second outer-roller bearing and the third outer-roller bearing covers the second rod section in parallel, the first outer-roller bearing is press-fit in the corresponding through hole of one of the three wheels which is adjacent to the rear carrier, and the second outer-roller bearing and the third outer-roller bearing are respectively press-fit in the corresponding through holes of the other two wheels.

\* \* \* \* \*